(12) United States Patent
Halford

(10) Patent No.: US 11,123,907 B2
(45) Date of Patent: Sep. 21, 2021

(54) MOULD TOOL HAVING MOVING PARTS

(71) Applicant: SURFACE GENERATION LIMITED, Oakham (GB)

(72) Inventor: Ben Halford, Rutland (GB)

(73) Assignee: SURFACE GENERATION LIMITED, Rutland (GB)

( * ) Notice: Subject to any disclaimer, the term of this patent is extended or adjusted under 35 U.S.C. 154(b) by 339 days.

(21) Appl. No.: 15/047,967

(22) PCT Filed: Aug. 18, 2014

(86) PCT No.: PCT/GB2014/052521
§ 371 (c)(1),
(2) Date: Feb. 19, 2016

(87) PCT Pub. No.: WO2015/025138
PCT Pub. Date: Feb. 26, 2015

(65) Prior Publication Data
US 2016/0207239 A1     Jul. 21, 2016

(30) Foreign Application Priority Data
Aug. 22, 2013  (GB) ..................... 1315020

(51) Int. Cl.
*B29C 33/44*  (2006.01)
*B29C 45/40*  (2006.01)
(Continued)

(52) U.S. Cl.
CPC .......... *B29C 45/4005* (2013.01); *B29C 45/73* (2013.01); *B29C 45/78* (2013.01);
(Continued)

(58) Field of Classification Search
CPC ....... B29C 33/02; B29C 33/442; B29C 45/26; B29C 45/4005; B29C 45/401;
(Continued)

(56) References Cited

U.S. PATENT DOCUMENTS

2010/0285170 A1* 11/2010 Galati ................. B29C 45/1775
425/562

FOREIGN PATENT DOCUMENTS

DE       10005300 C1   10/2001
JP       H03189121 A   8/1991
(Continued)

OTHER PUBLICATIONS

Patents Act 1977: Search Report under Section 17(5) dated Feb. 5, 2014 in UK application GB1315020.6.
(Continued)

*Primary Examiner* — James P Mackey
(74) *Attorney, Agent, or Firm* — Young Law Firm, P.C.

(57) ABSTRACT

A mould tool (100) has a first part (102) defining a first area (114) of a mould profile, an actuated part (130) defining a second, adjacent area (132) of the mould profile, which actuated part is configured to move from a moulding position to an actuated position at the end of each mould cycle to facilitate removal of a moulded component. The actuated part (130) comprises a temperature control apparatus (108) configured to control the temperature of the actuated part to influence a clearance (C) between the first part and the actuated part by thermal expansion and/or contraction of the actuated part.

9 Claims, 7 Drawing Sheets

(51) Int. Cl.
 *B29C 45/83* (2006.01)
 *B29C 45/73* (2006.01)
 *B29C 45/78* (2006.01)
 B29C 33/02 (2006.01)
 B29C 45/26 (2006.01)

(52) U.S. Cl.
 CPC ............ *B29C 33/02* (2013.01); *B29C 33/442* (2013.01); *B29C 45/26* (2013.01); *B29C 45/401* (2013.01); *B29C 2045/4026* (2013.01); *B29C 2045/7393* (2013.01); *B29C 2945/76531* (2013.01); *B29C 2945/76722* (2013.01)

(58) Field of Classification Search
 CPC . B29C 45/73; B29C 45/78; B29C 2045/4026; B29C 2045/7393; B29C 2945/76531; B29C 2945/76722
 See application file for complete search history.

(56) References Cited

FOREIGN PATENT DOCUMENTS

| | | | | |
|---|---|---|---|---|
| JP | 2005088527 | A | * | 4/2005 |
| JP | 2009050855 | A | | 3/2009 |
| JP | 2012000868 | A | | 1/2012 |
| WO | WO2011/048365 | A1 | * | 4/2011 ............ B29C 33/02 |

OTHER PUBLICATIONS

International Search Report in PCT/GB2014/052521, international filing date of Aug. 18, 2014.
UK-IPO Search Report dated Feb. 5, 2014 in priority application 1315020.6 filed Aug. 22, 2013.

* cited by examiner

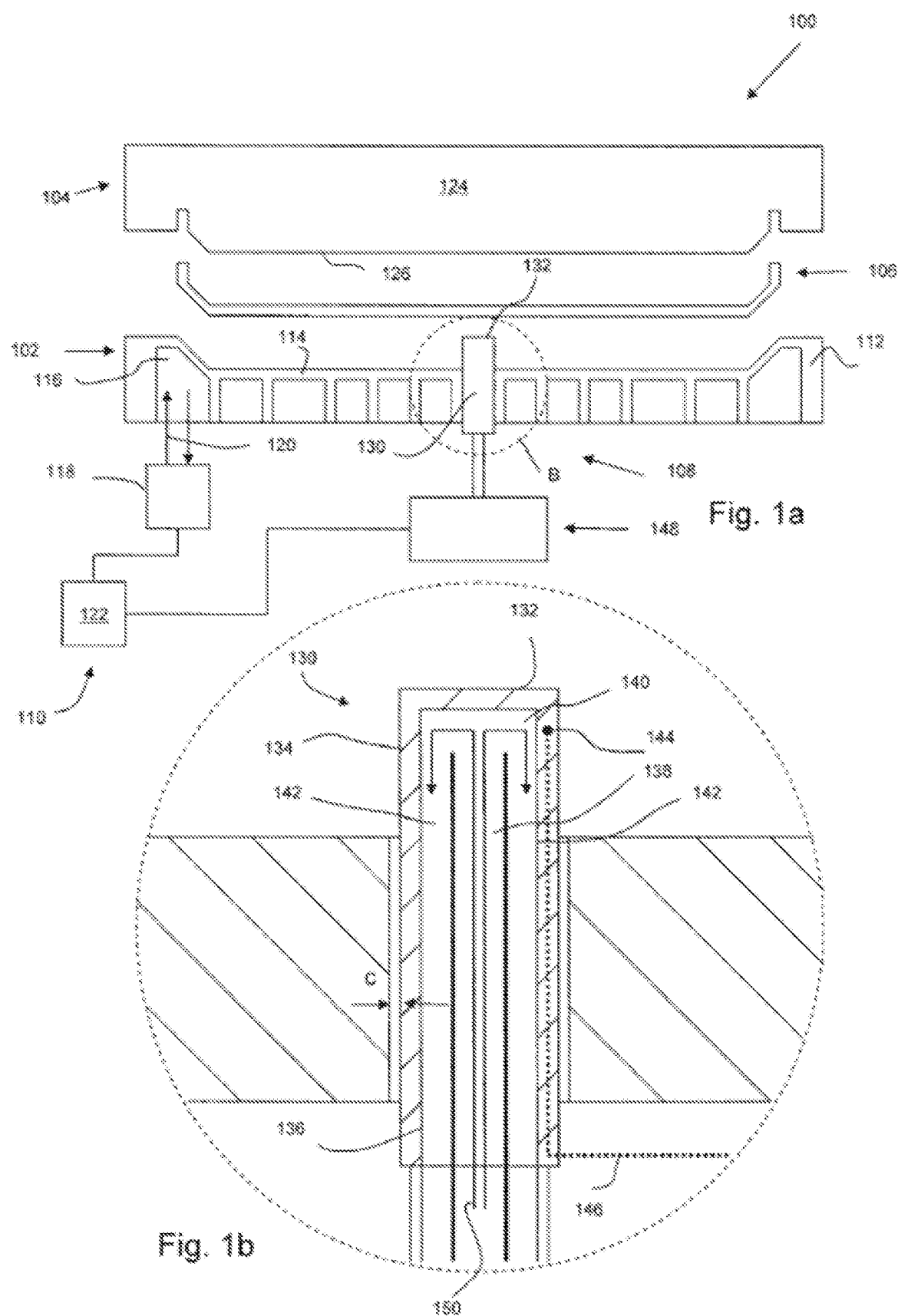

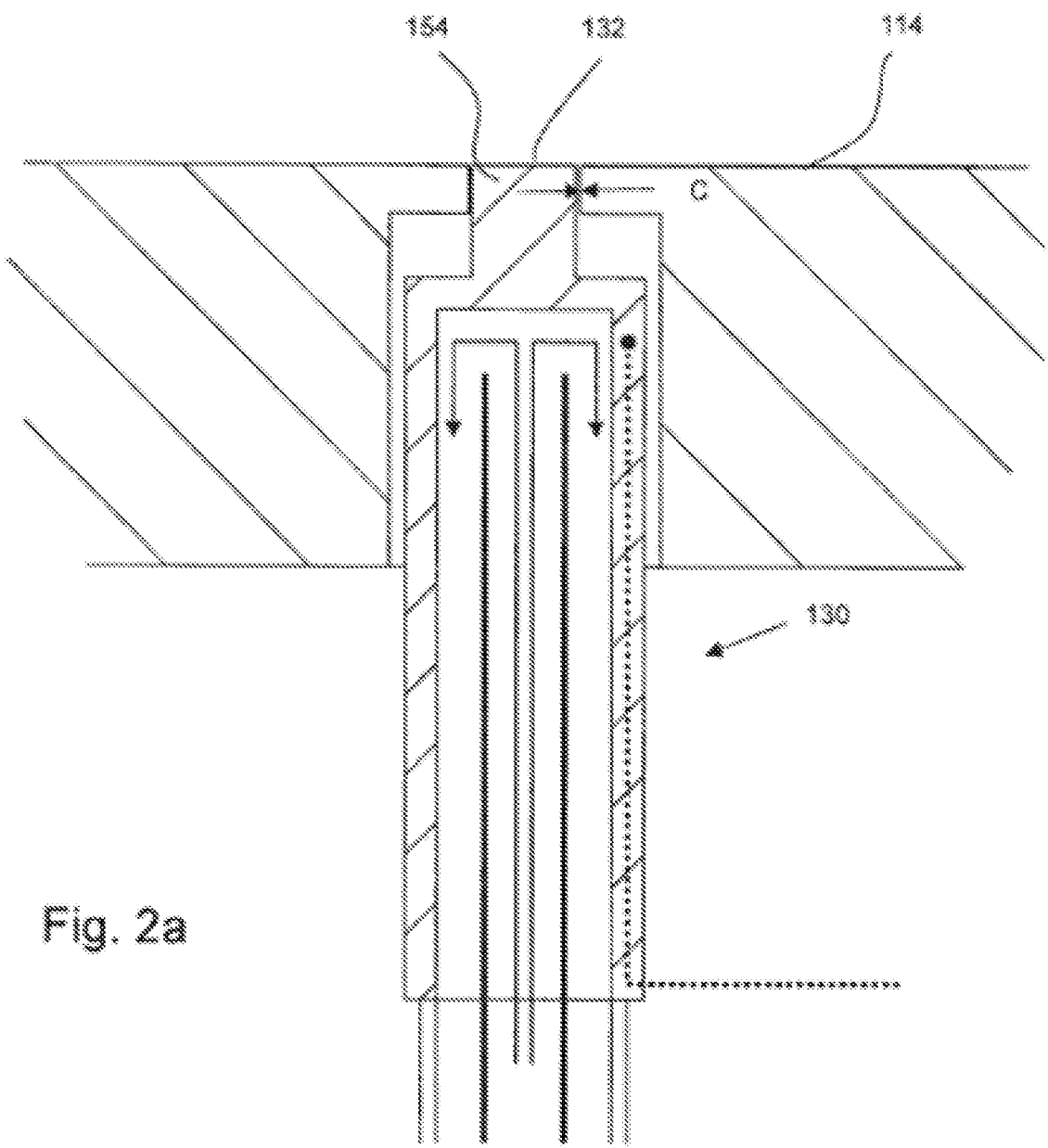

MOULD TOOL HAVING MOVING PARTS

BACKGROUND

The present invention concerns mould tools. More specifically, the present invention is concerned with mould tools comprising an actuated part such as an ejector pin, lifter or slide.

Components constructed from molten materials such as plastics materials or plastics matrix composites can be moulded in a two part mould tool. Such mould tools comprise two opposing parts each defining mould profiles which form a mould cavity in which molten material is introduced and cured to form the component Many consumer electronics components, such as mobile phone casings, laptop components etc, are formed in this manner.

The applicant's earlier patent application WO 2011/048365 (incorporated herein by reference where permitted) discloses a mould tool in which the mould profile is divided into a plurality of tessellated zones. Each zone has an associated temperature control system and as such the material cure can be influenced across the moulded component to obtain the desired material properties.

In order to eject the part from the mould once moulding has taken place, other known mould tools are provided with an ejector pin. The ejector pin normally sits flush with the mould profile of one part of the mould tool during curing until the mould opens at which point the pin advances to eject the component.

Another feature found in some mould tools is a lifter. Lifters normally sit flush with the mould profile of one part of the mould tool at their periphery during curing as with ejector pins, but may additionally define features which cannot be moulded in a traditional two part tool. When the mould opens following curing, the lifter may advance or hinge open to allow removal of the component.

A third feature found in some mould tools is a slide. Such slides advance in a transverse direction (i.e., normal to the direction of separation of the two main parts of the mould tool) to form part of the mould cavity. Slides are used in the event that features are required in the final component which cannot be moulded in a traditional two part tool. Such slides may be required to be withdrawn upon completion of curing of the part, before the mould may be opened, or the part removed.

Ejector pins, lifters and slides fall into the family of mould tool parts which are typically actuated at the end of each cycle to facilitate removal of the moulded component. This family of components is hereinafter referred to as "actuated parts".

There needs to be a clearance between such actuated parts and the adjacent tool part or parts in order to enable relative movement at the end of each moulding cycle. Although this is not a problem for inviscid materials, for viscous materials such as molten plastic, the mould material can flow into the clearance gap. This "flash" creates an unsightly appearance and may need to be removed either from the workpiece or the tool subsequent to moulding. This adds cost and time to the manufacturing process.

There also needs to be a sufficient reaction surface to operate these actuated parts. A key design driver for mould tools is thermal agility, a consequence of which is that their components are designed to be as light and thin as possible. This can be problematic when assembly a mould tool with actuated parts. given that such actuations must be repeatable over the lifetime of the tool, fatigue damage to the tool can occur if insufficient structure is included to support the reaction of the actuated parts. Especially problematic is providing sufficient reaction surfaces for sliders, which are commonly actuated in the X,Y planes, that is across and along the mould surface, rather than ejector pins, which more commonly are actuated in a direction normal to the mould surface (Z), and as such may utilise the entire depth of the tool to react their actuation loads.

It is an aim of the present invention to overcome or at least mitigate the above mentioned problems.

According to a first aspect of the invention there is provided a mould tool comprising:

a. a first part defining a first area of a mould profile;

b. an actuated part defining a second, adjacent area of the mould profile, which actuated part is configured to move from a moulding position to an actuated position at the end of each mould cycle to facilitate removal of a moulded component;

c. in which the actuated part comprises a temperature control apparatus configured to control the temperature of the actuated part to influence a clearance between the first part and the actuated part by thermal expansion and/or contraction of the actuated part.

Advantageously, the ability to individually control the temperature of the actuated part allows the part to be firmly expanded to close the gap between it and the surrounding components during moulding. The part can then be cooled, or allowed to cool, in order to expand the clearance and thus allow the actuator part to be easily actuated with respect to the remainder of the tool.

Preferably the temperature control apparatus is configured to alternately heat and cool the actuated part. The temperature control apparatus may be heated and/or cooled by a heated and/or cooled fluid. The fluid may be a gas. Preferably the temperature control apparatus comprises a fluid channel having a heater therein, which fluid channel is configured to direct fluid into the actuated part such that heating of the actuated part can be achieved by heating fluid passing the heater. In this instance, preferably the temperature control apparatus has a controller arranged to switch between a heating mode in which the heater is activated, and a cooling mode in which the heater is inactive, in which fluid flows into the actuated part in both the heating and cooling modes. The flow rate of the fluid in the cooling mode is increased in the cooling mode compared to the heating mode.

Advantageously, this type of system allows for fast and effective heating and cooling using a compressed air source and an in-line air heater. It is also compatible with the applicant's existing systems and as such is easily retrofitted thereto.

Preferably there is provided a temperature sensor arranged to measure the temperature of the actuated part and feed back a temperature signal to the controller. This prevents over/under heating of the part. Alternatively, or in addition, a strain gauge may be provided arranged to measure the strain of the actuated part and feed back a strain signal to the controller.

The system may be installed in a mould tool arranged such that the mould face is divided a plurality of temperature controlled zones, each zone having an independently operable temperature control apparatus, per the applicant's previous mould tool design.

Preferably the temperature control apparatuses of the temperature controlled zones share a common controller with the temperature control apparatus of the actuated part.

Preferably there is provided a tool controller configured to control a mould tool cycle, which tool controller is configured to:

a. firstly demand that the actuated part is moved to the moulding position;
b. secondly demand that the actuated part is heated by the temperature control apparatus;
c. thirdly demand that the actuated part is cooled by the temperature control apparatus; and,
d. fourthly demand that the actuated part is moved to the actuated position.

The actuated part may be supported by an actuation assembly, thermally isolated from the mould tool. Advantageously this arrangement allows sufficient reaction surface to be provided for the actuated part without affecting the thermal agility of the mould tool itself. It further facilitates retro-fit and customisation of existing mould tools using fluid heating and cooling.

According to a second aspect of the invention there is provided a method of manufacturing a moulded component comprising the steps of:

a. providing a mould tool having a first part defining a first area, and an actuated part defining a second, adjacent area;
b. moving the actuated part to a moulding position where the first and second areas form a continuous mould profile;
c. independently heating the actuated part to close a gap between the actuated part and the first part;
d. curing a moulded component in the mould tool;
e. independently cooling the actuated part to open a gap between the actuated part and the first part; and,
f. moving the actuated part to facilitate removal of the moulded component from the mould tool.

BRIEF DESCRIPTION OF THE DRAWINGS

A mould tool and associated method will now be described in accordance with the present invention and with reference to the following figures, in which:

FIG. 1a is a schematic side section view of a first mould tool in accordance with the present invention in an open position;

FIG. 1b is a detail view of region B of FIG. 1a;

FIG. 2a is a side section view of a part of a second mould tool in accordance with the present invention;

DESCRIPTION

Figure 1C:
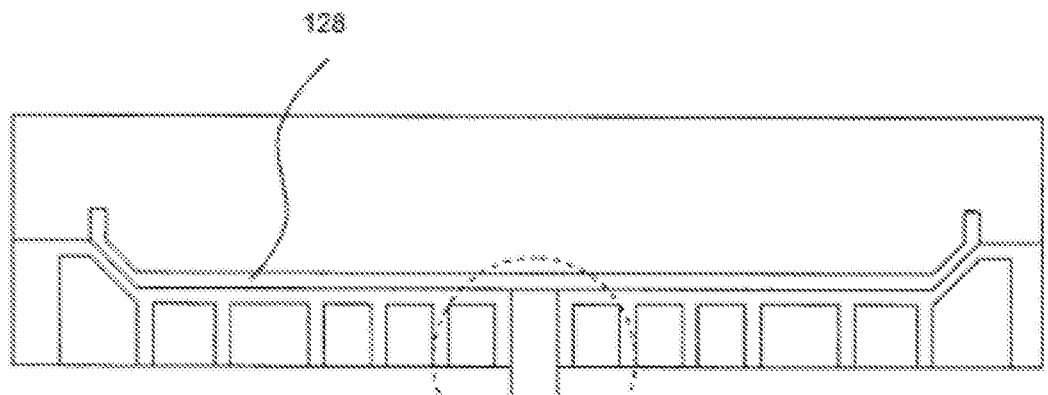
FIG. 1c is a side section view of the mould tool of FIG. 1a in a closed position.

Turning to FIGS. 1a to 1d, there is shown a mould tool 100 comprising a first tool part 102, a second tool part 104, an injector pin assembly 108, and a temperature control system 110. A workpiece 106 formed by the mould tool 100, is also shown.

The first part 102 of the mould tool 100 is a lower part and comprises a body 112 constructed from a metal material and defining a mould profile 114 on its upper surface. The mould profile 114 defines part of the outer surface of the workpiece 106.

Within the body 112 there are provided a plurality of cavities 116, on the opposite side to the mould profile 114. Each of the cavities 116 has an associated temperature control assembly 118 which is arranged to provide a fluid flow 120 to and from the cavity 116 in order to alternately heat and cool the mould profile 114 of the mould tool body 112. In this example, the temperature control assembly 118 comprises a compressed air source which feeds compressed air through an inline heater into the cavity 116. The air impinges on the back face of the mould profile 114. Heating or cooling of the mould profile 114 is carried out by controlling the inline heater and air flow rate. For heating, a relatively low flow rate (in the order of 35 l/min) is provided with the heater activated, and for cooling a higher flow rate (in the order of 100 l/min) is provided with the heater deactivated.

Each cavity defines a separately controlled zone of the mould profile 114, such that heating and cooling can be varied across the profile 114. The zones are tessellated to form a continuous controlled surface such that the properties of the workpiece 106 can be carefully managed during curing. This is described in more detail in the applicant's earlier patent application WO 2011/048365.

The temperature control assembly 118 is controlled by a master controller 122 which receives feedback from the tool body 112 via a series of temperature control sensors (not shown).

Opposite the first part 102, the second part 104 comprises a body 124 defining an opposing mould profile 126 which together with the profile 114 defines the outer surface of the workpiece 106. In use, the first and second parts 102, 104 are brought together to define a mould cavity 128 as shown in FIG. 1c.

The ejector pin assembly 108 comprises an ejector pin 130 which defines an end surface 132 which forms part of the mould profile 114. The ejector pin 130 is moveably mounted within the body 112 of the first part 102 to move between (i) a position where the end surface 132 forms a continuous, smooth, uninterrupted surface with the first profile 114 as shown in FIG. 1c and (ii) a position where the ejector pin 130 is advanced from the profile 114 towards the second part 124 to eject the workpiece 106 as shown in FIG. 1a. The ejector pin 130 is moved by an appropriate actuation assembly such as a solenoid (not shown).

Turning to FIG. 1b, the ejector pin 130 defines a body 134 having an internal cavity 136. The cavity 136 is shaped so as to form a fluid inlet channel 138, a fluid stagnation region 140 opposite the end surface 132, and a fluid return channel 142. A thermocouple 144 is provided proximate the end surface 132 and comprises a data connection 146.

The ejector pin assembly 108 further comprises a temperature control assembly 148 which is arranged to deliver a heating/cooling fluid flow 150 into the ejector pin 130 which flows to the stagnation region 140 where it impinges on the back face of the end surface 132 and returns via the fluid return channel 142. The flow 150 may be configured to be a heating or cooling flow in the same manner as the flow 120.

When the temperature control assembly 148 is in heating mode, the ejector pin 130 expands and ensures a tight fit between it and the body 112. When the temperature control assembly 148 is in cooling mode, the ejector pin 130 contracts, and thereby increases a clearance between it and the surrounding tool part.

Figure 1D:
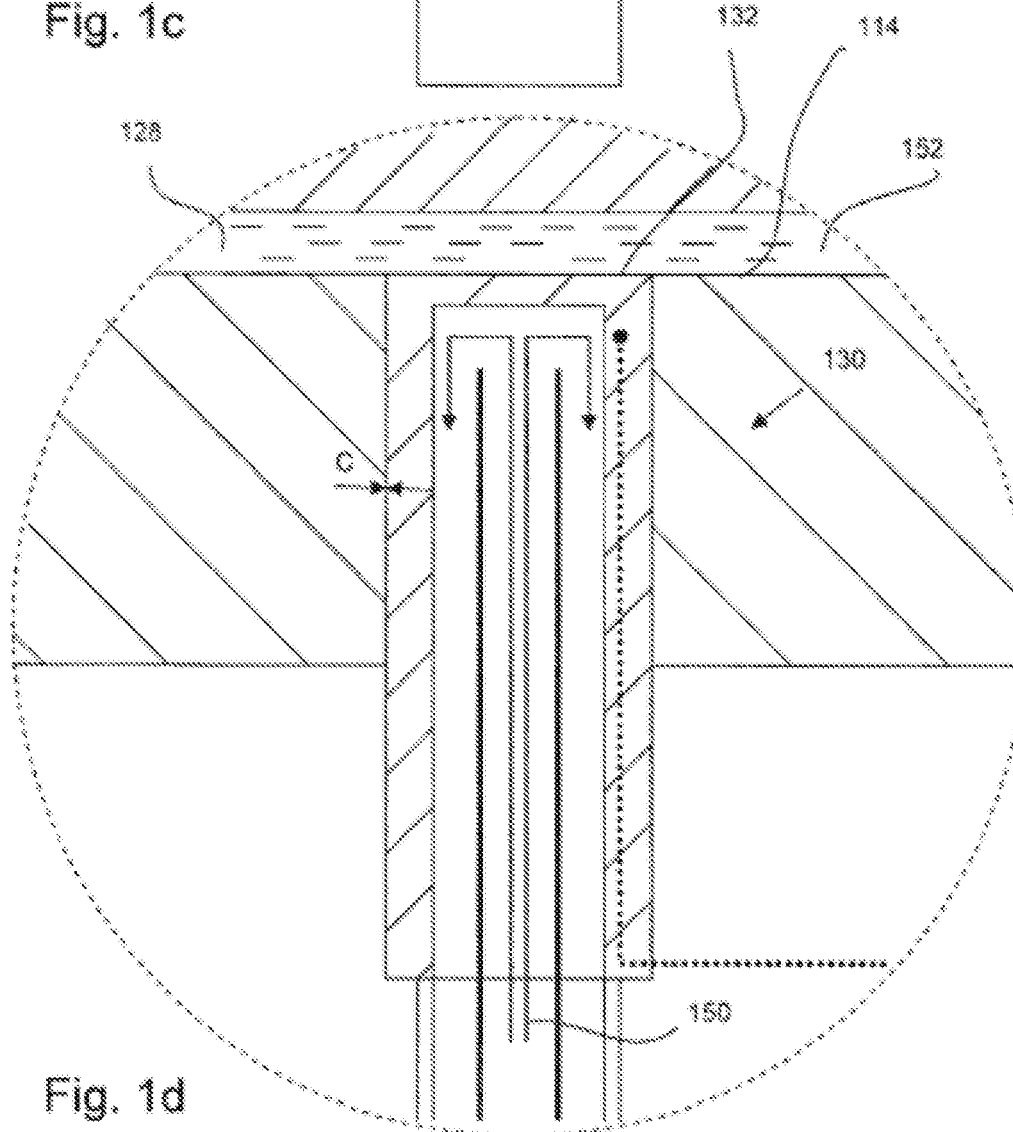
FIG. 1d is a detail view of the area D of FIG. 1c.

As shown in FIG. 1b, the ejector pin 130 is in an actuable mode in which a clearance gap C is provided, (in this instance the pin is cool). Turning to FIG. 1d, the mould is undergoing a moulding operation with a molten material 152 present in the mould cavity 128. In this condition it is undesirable for the molten material 152 to enter the gap C and, as such, the ejector pin 130 is heated by the flow 150 to expand it relative to the body 112 and thereby minimise gap C. Ejector pin 130 has been expanded to the point at which gap C is zero. It will be noted that in this condition both the profile 114 and the end surface 132 cooperate to form an uninterrupted mould face to form the workpiece 106.

As such, the ejector pin assembly 108 has two modes, a heated and a cooled mode. Under the heated mode a relatively low flow is provided through an activated heater to expand the pin. In the cooled mode, as shown in FIG. 1b, a higher flow is provided without the heater being activated to cool the pin.

As shown in FIG. 1a, the temperature control assembly 148 for the ejector pin 108 may be controlled by the master controller 122. This provides the advantage that the invention can be retrofitted to mould tools which already have multiple temperature control channels (such as those described the applicant's prior application). Simply utilising an additional channel from the master existing control system will allow control of the heated/cooled ejector pin.

In use, the ejector pin 130 is moved into the moulding position (FIG. 1c) where the first and second areas form a continuous mould profile. The pin 130 is then independently heated to close the clearance C between the pin 130 and the first part 102. The workpiece is then cured in the mould tool and once cured (or at least once the molten material is sufficiently inviscid not to flow into the clearance C) the pin 130 is independently cooled to open the clearance C. The pin 130 is then moved into the mould cavity to push the workpiece 106 from the mould tool (see FIG. 1a).

Figure 2B:
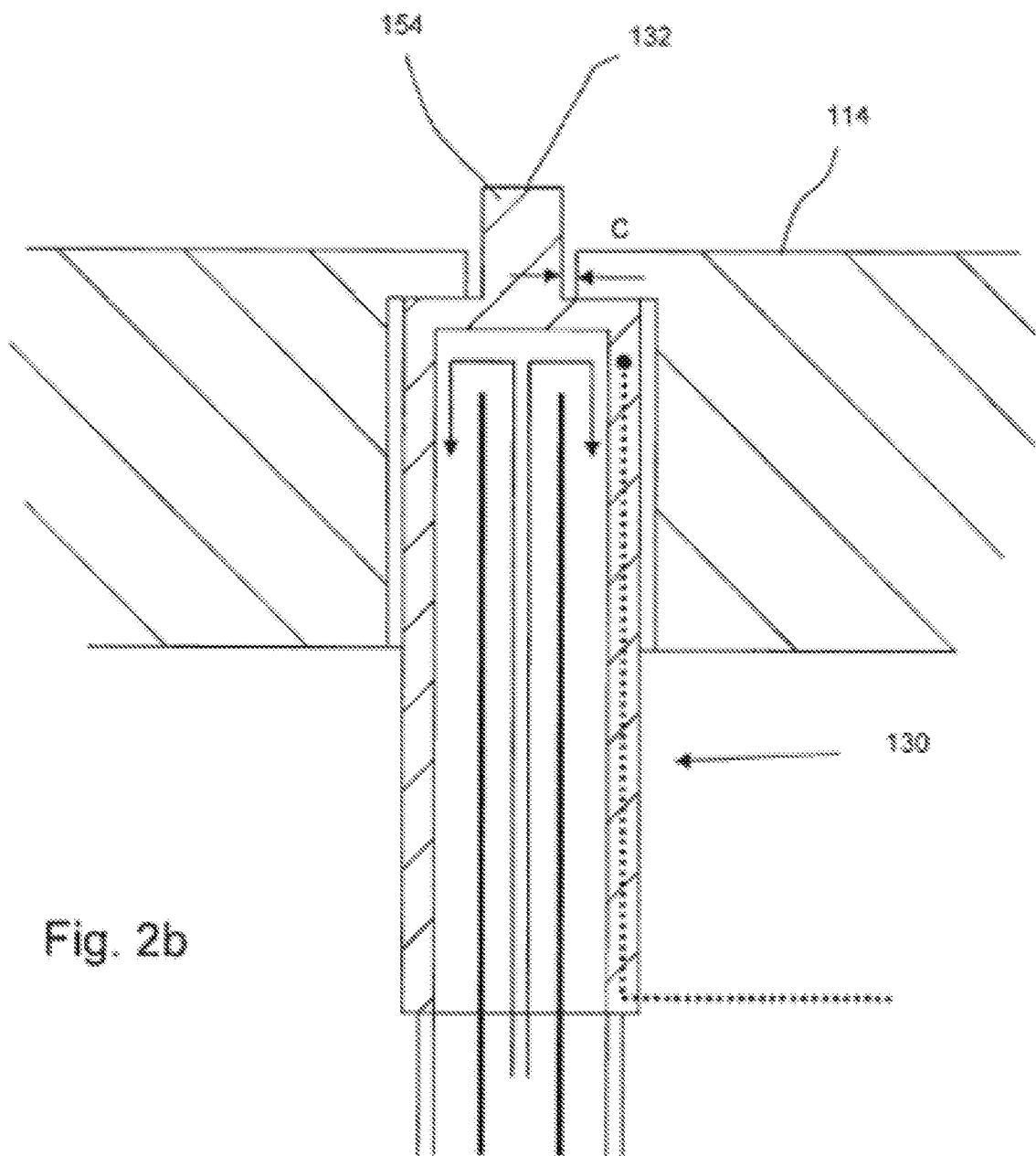
FIG. 2b is a further view of the part of the mould tool of FIG. 2a in a different position.

Referring to FIGS. 2a and 2b, there is shown an alternative ejector pin assembly. Reference numerals for like components are the same as for FIGS. 1a to 1d. The main difference between the ejector pin 130 of FIGS. 2a and 2b, is that a nipple 154 is provided projecting from the end thereof to define the end surface 132. The nipple 154 does not contain any part of the heated/cooled fluid channel and projects to allow the end surface 132 to be as small as possible.

Figure 3A:
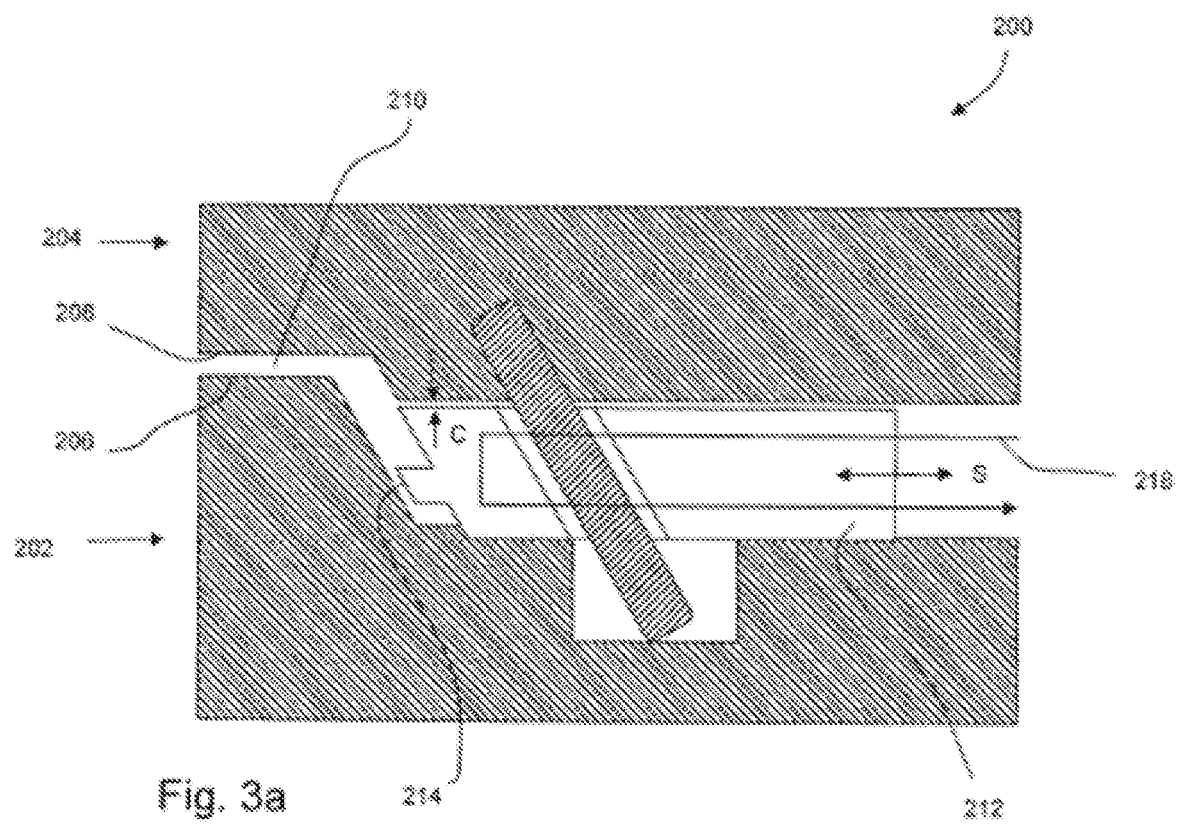
FIG. 3a is a side section view of a part of a third mould tool in accordance with the present invention.
Figure 3B:
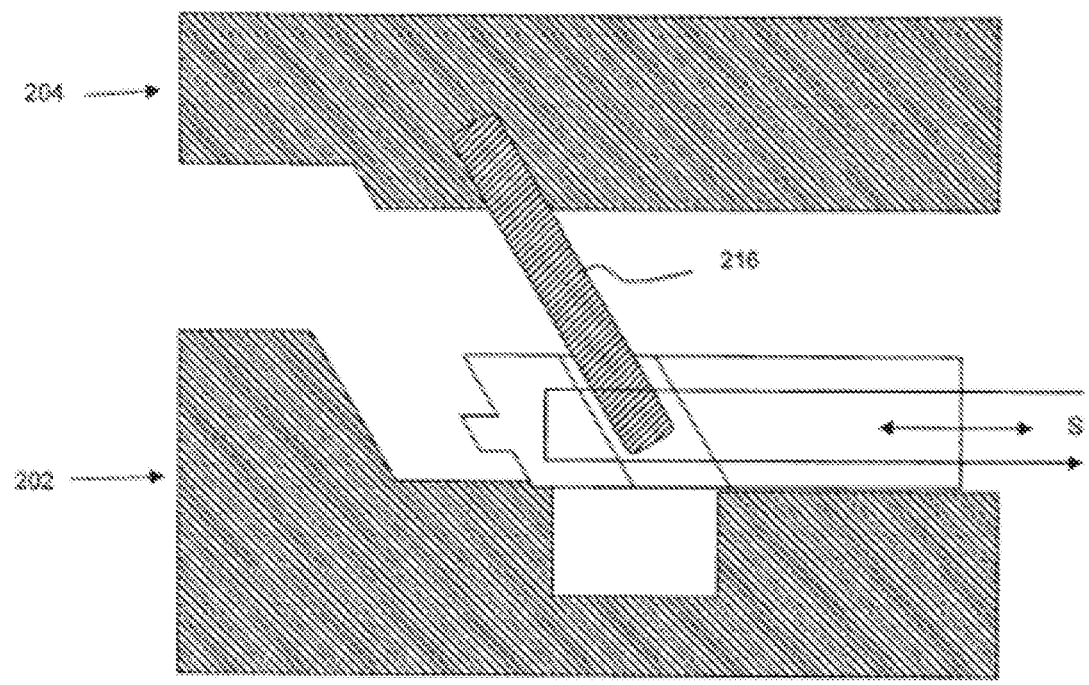
FIG. 3b is a further view of the part of the mould tool of FIG. 3a in a second position.

Turning to FIGS. 3a and 3b, a third mould tool 200 is shown, also having a first part 202 and a second part 204. The first part 202 defines a first profile 206, the second part 204 defines a second profile 208. The profiles 206, 208 cooperate to define a cavity 210 for forming a workpiece. At the side of the cavity 210 there is provided a mould tool slide 212, which is configured to move in direction S to provide an undercut feature 214 in the workpiece. Like the pin 130, the slide 212 is actuated at the end of each mould cycle to allow the workpiece to be ejected.

The slide 212 is moveably mounted with respect to the first part 202 and is actuated by a slide pin 216 projecting from the second part 204 of the tool 200. It will be noted that in the closed position as shown in FIG. 3a, there is a clearance C between the slide 212 and the second part 214.

As with the previous embodiment, a fluid temperature control assembly comprising a fluid flow system 218 is provided to heat and cool the slide 212 to expand and contract as required. As such, the clearance gap C can be reduced by thermal expansion of the slide 212 during the moulding process.

The moulding process is very much the same as for the embodiment of FIGS. 1a to 1d, but instead of the slide 212 being moved into the cavity, it is moved away from the cavity. This is because the workpiece cannot be removed without such movement taking place. In both instances, movement of the relevant actuated part facilitates removal of the workpiece.

Figure 4A:
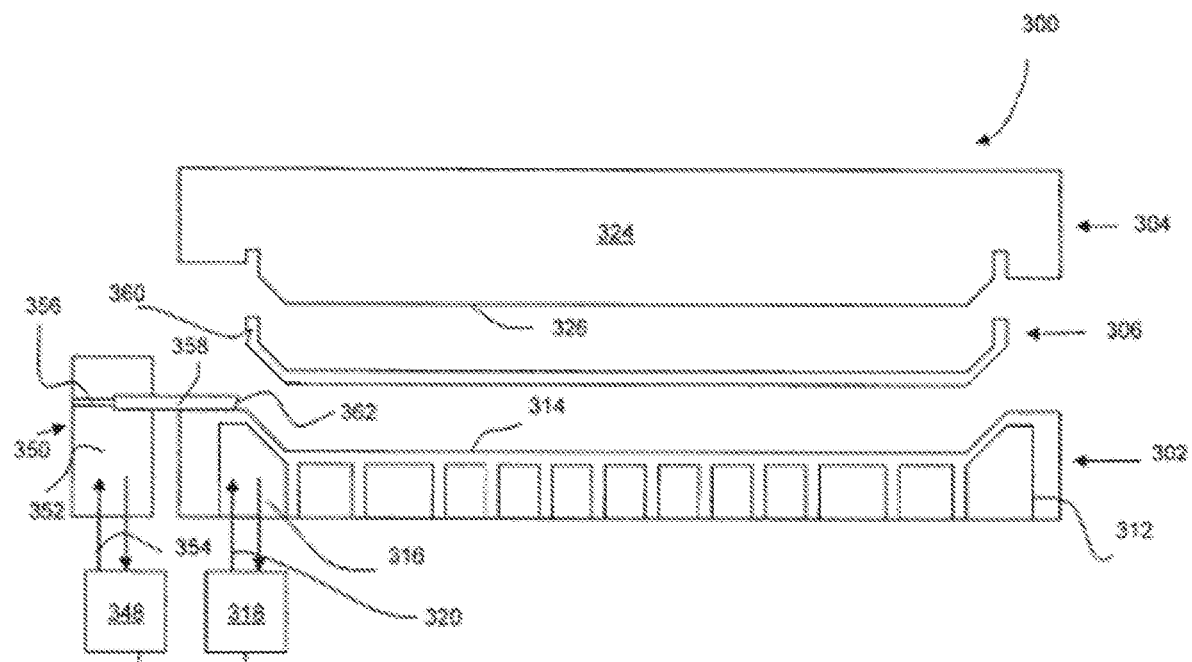
FIG. 4a is a schematic side section view of a fourth mould tool in accordance with the present invention in an open position.
Figure 4B:
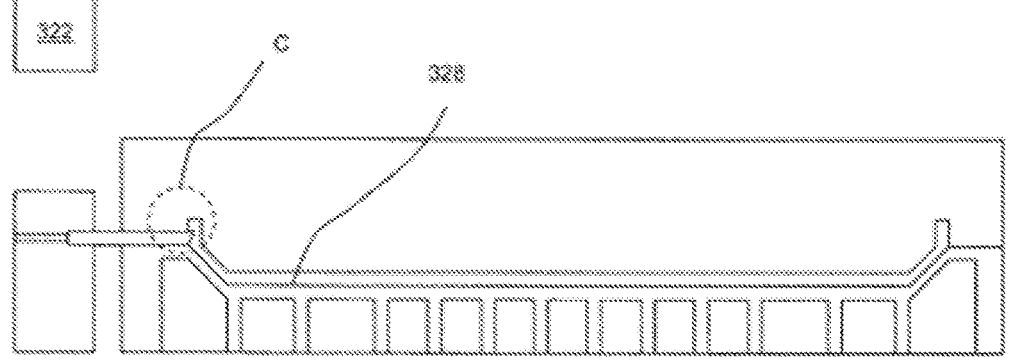
FIG. 4b is a side section view of the mould tool of FIG. 4a in a closed position.

Turning to FIGS. 4a and 4b, a fourth mould tool 300 is shown, also having first tool part 302, a second tool part 304 and a temperature control system 310. Mould tool 300 also includes thermally isolated slider assembly 350. A workpiece 306 formed by the mould tool 300, is also shown.

The first part 302 of the mould tool 300 is a lower part and comprises a body 312 constructed from a metal material and defining a mould profile 314 on its upper surface. The mould profile 314 defines part of the outer surface of the workpiece 306.

Within the body 312 there are provided a plurality of cavities 116, on the opposite side to the mould profile 314. Each of the cavities 316 has an associated temperature control assembly 318 which is arranged to provide a fluid flow 320 to and from the cavity 316 in order to alternately heat and cool the mould profile 314 of the mould tool body 312. In this example, the temperature control assembly 318 comprises a compressed air source which feeds compressed air through an inline heater into the cavity 316. The air impinges on the back face of the mould profile 314. Heating or cooling of the mould profile 314 is carried out by controlling the inline heater and air flow rate. For heating, a relatively low flow rate (in the order of 35 l/min) is provided with the heater activated, and for cooling a higher flow rate (in the order of 100 l/min) is provided with the heater deactivated.

Each cavity defines a separately controlled zone of the mould profile 314, such that heating and cooling can be varied across the profile 314. The zones are tessellated to form a continuous controlled surface such that the properties of the workpiece 306 can be carefully managed during curing. This is described in more detail in the applicant's earlier patent application WO 2011/048365.

The temperature control assembly 318 is controlled by a master controller 322 which receives feedback from the tool body 312 via a series of temperature control sensors (not shown).

Opposite the first part 302, the second part 304 comprises a body 324 defining an opposing mould profile 326 which together with the profile 314 defines the outer surface of the workpiece 306. In use, the first and second parts 302, 304 are brought together to define a mould cavity 328 (see FIG. 4b).

The slider assembly 350 is arranged adjacent one side of first part 302, thermally isolated therefrom. Slider assembly 350 comprises a slider 358 which defines an end surface 362 which forms part of the mould profile 314. The slider 358 is moveably mounted within the body 352 of the slider assembly 350 to move between (i) a position where the end surface 362 forms a recessed detail 360 in the workpiece 306 as shown in FIG. 4b and (ii) a position where the slider 358 is withdrawn normal to the direction of separation of the first and second parts 302, 304 to eject the workpiece 306 as shown in FIG. 4a. The slider 358 is moved by an appropriate actuation assembly 356 such as a solenoid.

Turning to FIG. 1c, the slider 358 defines a body 334 having an internal cavity 336. The cavity 336 is shaped so as to form a fluid inlet channel 338, a fluid stagnation region 340 opposite the end surface 362, and a fluid return channel 342. A thermocouple 344 is provided proximate the end surface 362 and comprises a data connection 346.

The slider assembly 350 further comprises a temperature control assembly 348 which is arranged to deliver a heating/cooling fluid flow 354 into the slider 358 which flows to the stagnation region 340 where it impinges on the back face of the end surface 362 and returns via the fluid return channel 342. The flow 354 may be configured to be a heating or cooling flow in the same manner as the flow 320.

When the temperature control assembly 348 is in heating mode, the slider 358 expands and ensures a tight fit between it and the bodies 312, 324. When the temperature control assembly 148 is in cooling mode, the slider 358 contracts, and thereby increases a clearance between it and the surrounding tool part.

Figure 4C:
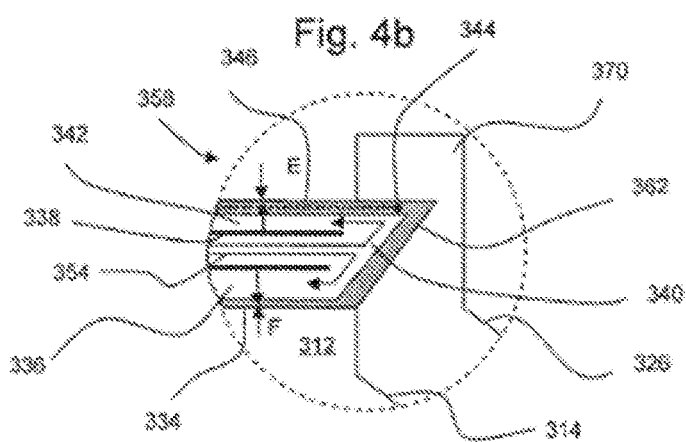
FIG. 4c is a detail view of the area C of FIG. 4b.

As shown in FIG. 4c, the mould is undergoing a moulding operation with a molten material 370 present in the mould cavity 328. In this condition it is undesirable for the molten material 370 to enter gap E between the slider 358 and the body 312, or gap F between the slider 358 and the body 324 and, as such, the tool pin 130 is heated by the flow 150 to expand it relative to the bodies 312, 324 and thereby minimise gaps E and F. Slider 258 has been expanded to the point at which gaps E and F are zero. It will be noted that in this condition both the profiles 314, 326 and the end surface 362 cooperate to form an uninterrupted mould face to form the workpiece 306.

As such, the slider assembly 350 has two modes, a heated and a cooled mode. Under the heated mode a relatively low flow is provided through an activated heater to expand the slider. In the cooled mode a higher flow is provided without the heater being activated to cool the slider.

As shown in FIG. 4a, the temperature control assembly 348 for the slider 358 may be controlled by the master controller 322. This provides the advantage that the invention can be retrofitted to mould tools which already have multiple temperature control channels (such as those described the applicant's prior application). Simply providing the additional slider assembly 350 alongside the existing mould tool assembly 300 and connection the two assemblies will allow control of the heated/cooled slider.

In use, the slider 358 is moved into the moulding position (FIG. 4c) where the first and second areas form a continuous mould profile. The slider 358 is then independently heated to close the clearances E and F between the slider 358 and the first part 302 and second part 304 respectively. The workpiece is then cured in the mould tool and once cured (or at least once the molten material is sufficiently inviscid not to flow into the clearances E and F) the slider 358 is independently cooled to open the clearances E and F. The slider 358 is then withdraw from the mould cavity to allow the workpiece 306 to be removed from the mould tool (see FIG. 4a).

Figure 5:
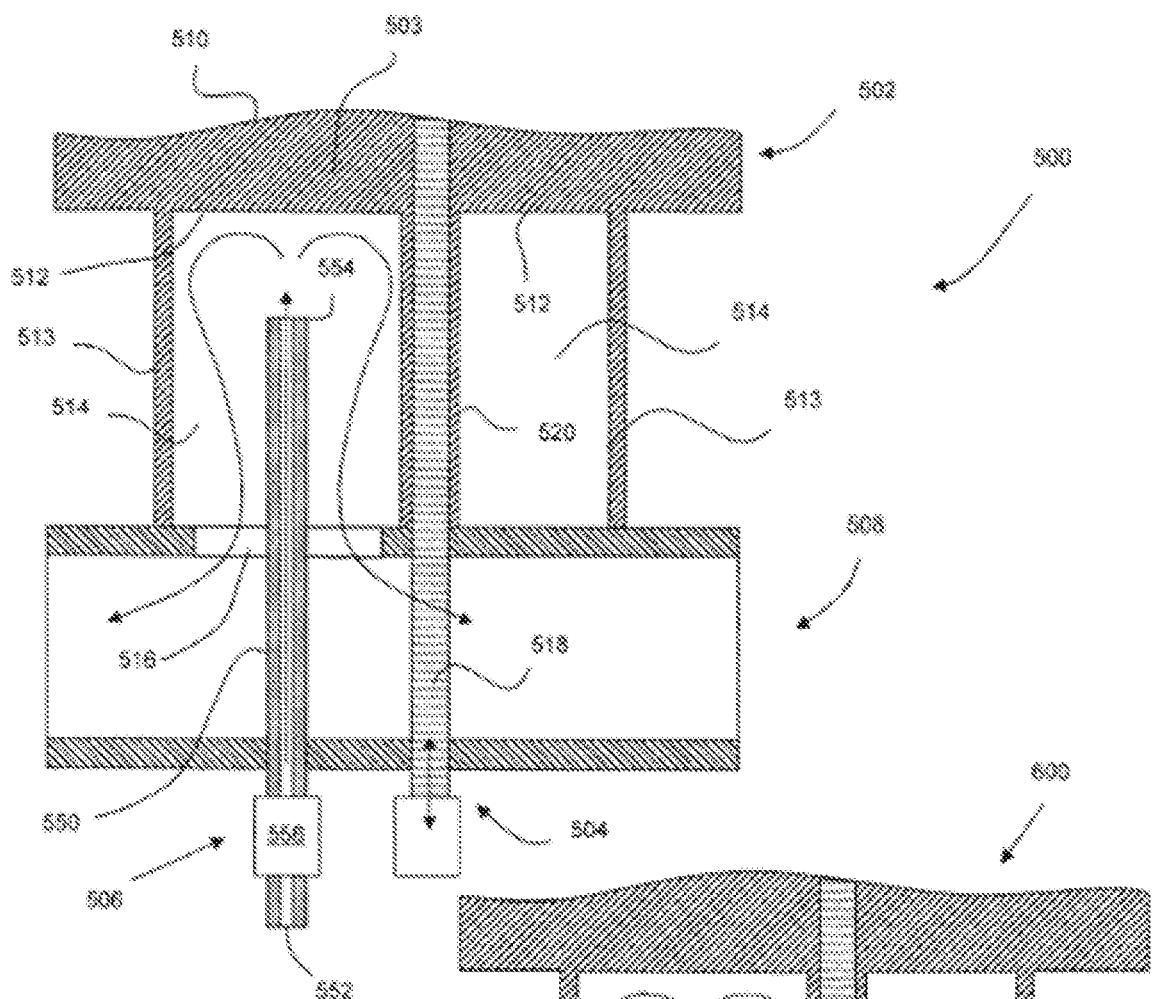
FIG. 5 is a schematic side section view of a fifth mould tool in accordance with the present invention.

Turning to FIG. 5, a fifth mould tool 500 is shown. The tool 500 comprises a first tool part 502, an ejector pin assembly 504 and a temperature control system 506. The tool further comprises an exhaust layer 508 which sits below the first tool part 502 in use.

As with the tool part 102, the tool part 502 comprises a body 503 defining a mould profile 510 for a workpiece. On the opposite side of the body 503 to the mould profile 510, there is provided a temperature control surface 512 which is heated and cooled by the temperature control assembly 506 as will be described below.

A temperature control cavity 514 is defined on the underside of the mould tool part 502 and bounded in part by the temperature control surface 512, and by a sidewall 513.

The temperature control system 506 comprises a fluid conduit 550 having an inlet 552 connected to a pressurised air source and an outlet 554 directed at the temperature control surface 512. An in-line fluid heater 556 heats the air passing through the conduit 550.

The fluid impinges on the temperature control surface 512 to heat the body 503 and flows into the exhaust layer 508 via an exhaust inlet 516 where it is mixed with the exhaust from adjacent tool cavities.

The ejector pin assembly 504 comprises an ejector pin 518 which extends through the exhaust layer 508 to the mould profile 510. As such, the ejector pin 518 needs to pass through the cavity 514. There is a risk that when molten material is in the tool 500, it may flow from the mould profile side of the body 503 around the annulus surrounding the ejector pin 518 and into the cavity 514. There is a risk it may come into contact with the temperature control system 506 which would be undesirable as it may burn or even ignite. As such, extending downwardly from the temperature control surface 512 from the tool part 502, there is provided an ejector collar 520 which extends all the way to the exhaust layer 508. As such, contact between the assembly 506 and any entrained molten material is made extremely unlikely.

Figure 6:
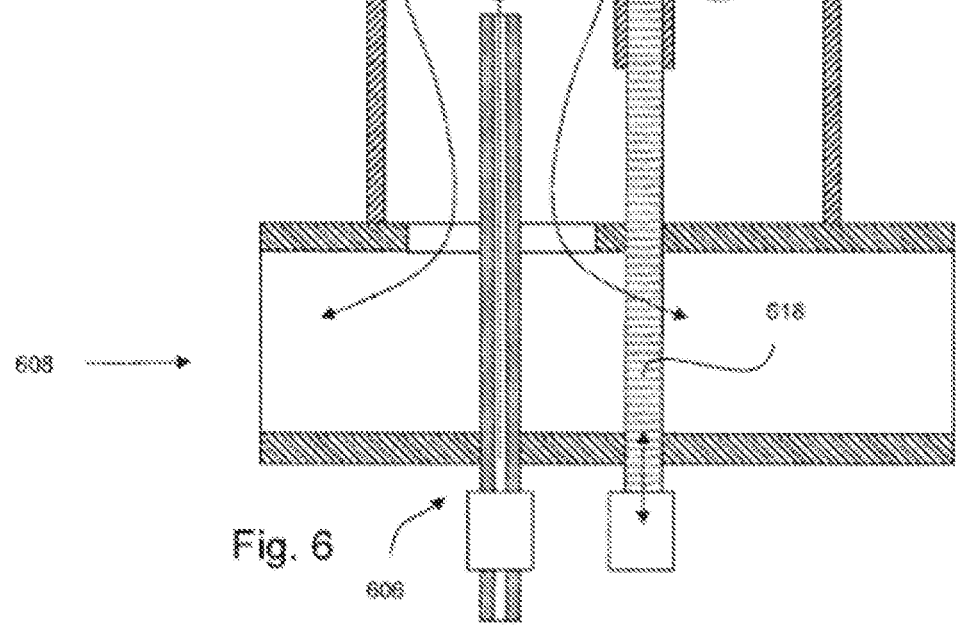
FIG. 6 is a schematic side section view of a sixth mould tool in accordance with the present invention.

Turning to FIG. 6, a mould tool 600 is shown which is similar to the mould tool 500. A collar 620 only extends part way towards the exhaust layer 608. The collar 620 extends along the ejector pin 618 to a level lower (i.e. further away from the temperature control surface) than the outlet of the temperature control assembly 606. This ensures that any entrained molten material cannot come into contact with the heater by dripping directly onto it.

Variations fall within the scope of the present invention. Other components which are slidable, and therefore must have a clearance between themselves and a mould tool can be manipulated using the present invention.

As well as air heating and cooling, other fluids may be used for temperature control, such as liquids. Electric heating can be used and the slidable part can be left to cool and therefore contract naturally.

Instead or as well as a temperature sensor, the actuated part may comprise a strain sensor, which can be used to determine when the desired level of expansion has occurred.

Multiple actuated parts (ejector pins, lifters and slides) may be provided in combination.

The invention claimed is:

1. A mould tool comprising:
   a first tool part defining:
      a unitary and continuous first mould profile surface, and
      a plurality of adjacent cavities, each of the cavities defining an independently-controlled temperature zone coupled to an independently-operable temperature control apparatus that is configured to provide a fluid flow to the cavity to alternately heat and cool the unitary and continuous first mould profile surface,
      wherein the unitary and continuous first mould profile surface extends over the plurality of cavities;
   a second tool part defining a second mould profile surface that faces and that matches the unitary and continuous first mould profile surface such that a workpiece is mouldable between the first and second mould profile surfaces;

an actuator assembly that is coupled to a further temperature control apparatus and that comprises a selectively-enabled actuated part separated from the first tool part by a selectably open and closed clearance, the actuated part being movably mounted to the first tool part and controllable by the further temperature control apparatus to assume a heated mode position in which the clearance is completely closed and in which an end surface of the actuated part is aligned with the unitary and continuous first mould profile surface to form a smooth uninterrupted surface therewith, and to assume a cooled mode position in which the clearance is open and in which the end surface of the actuated part is moved through the unitary and continuous first mould profile surface toward the second mould profile surface of the second tool part; and a controller configured to independently control each of the independently-operable temperature control apparatuses in each of the independently-controlled temperature zones of the first tool part and to independently control the further temperature control apparatus of the actuator assembly.

2. A mould tool according to claim 1, wherein the further temperature control apparatus is configured to alternately heat and cool the actuated part.

3. A mould tool according to claim 1, wherein the further temperature control apparatus is heated and/or cooled by a heated and/or cooled fluid.

4. A mould tool according to claim 3, wherein the further temperature control apparatus comprises a fluid channel having a heater therein, which fluid channel is configured to direct fluid into the actuated part such that heating of the actuated part is carried out by heating fluid passing the heater.

5. A mould tool according to claim 4, wherein the further temperature control apparatus comprises a further controller that is configured to switch between the heated mode in which the heater is activated, and the cooled mode in which the heater is inactive, and an inactive mode in which fluid flows into the actuator assembly in both the heated and cooled modes.

6. A mould tool according to claim 5, wherein the further controller is configured to increase a flow rate of fluid in the cooled mode compared to the heated mode.

7. A mould tool according to claim 5, further comprising a temperature sensor configured to measure a temperature of the actuator assembly and feed a temperature signal back to the further controller.

8. A mould tool according to claim 5, further comprising a strain gauge configured to measure a strain of the actuator assembly and to feed a strain signal back to the further controller.

9. A mould tool according to claim 1, wherein the controller configured to independently control each of the independently-operable temperature control apparatuses is further configured to:

firstly command that the actuator assembly be moved to a moulding position;

secondly command that the actuated part be heated by the further temperature control apparatus;

thirdly command that the actuated part be cooled by the further temperature control apparatus; and, fourthly command that the actuated part be moved to the cooled mode position such that the end surface of the actuated part is moved through the unitary and continuous first mould profile surface of the first tool part toward the second mould profile surface of the second tool part.

* * * * *